April 12, 1927.  W. E. GILL  1,624,047

BATTERY CONNECTION

Filed June 19, 1922

Witness:  
Inventor  
William E. Gill.

Patented Apr. 12, 1927.

1,624,047

UNITED STATES PATENT OFFICE.

WILLIAM E. GILL, OF LAKE GENEVA, WISCONSIN.

BATTERY CONNECTION.

Application filed June 19, 1922. Serial No. 569,299.

This invention relates in general to electrical connections, and while the principles thereof may be utilized for various purposes, I have chosen to illustrate the invention in this application as embodied in a structure for connecting the electrical conducting cables to a storage battery or the like.

In connections of this general character with which I am familiar, the cable terminals to which the cables are attached are equipped with provisions for detachably connecting or securing the terminals to the battery studs, but such securing provisions have been fixed as to position with respect to the cables. Since the direction in which the cables lead from the battery are determined by the location of the battery with respect to the other electrical apparatus of the equipment and vary in different installations, it not infrequently happens that the fastening or securing means are necessarily so positioned with respect to adjacent parts of the equipment as to be quite inaccessible, making it therefore difficult to attach and detach the terminal.

One of the primary purposes of my present invention is to provide a connection in which both the cable terminal and the fastening or locking means by which the terminal is locked to the battery stud, are readily adjustable so that the cable may lead from the battery in the desired direction and the locking means may be disposed in a conveniently accessible position for manipulation.

Another object of my invention is to provide a connection of the character indicated which can be readily applied to a battery stud and easily disconnected therefrom, the structure being such that when the fastening or locking device is loosened, the terminal may be readily freed from the stud without the necessity of prying or hammering the same in order to release it.

Another feature of my invention resides in the fact that the battery terminal may be made entirely of lead, instead of being made of brass, steel or other metal, such as has customarily been used and which is subject to corrosion by acid which may come in contact therewith from the batteries. The lead being non-corrosive is consequently more durable and satisfactory in use.

Other objects and advantages of my invention should be readily appreciated by those skilled in the art as the same becomes better understood by reference to the following description, when considered in connection with the accompanying drawings.

Referring to the drawings.

Figure 1:
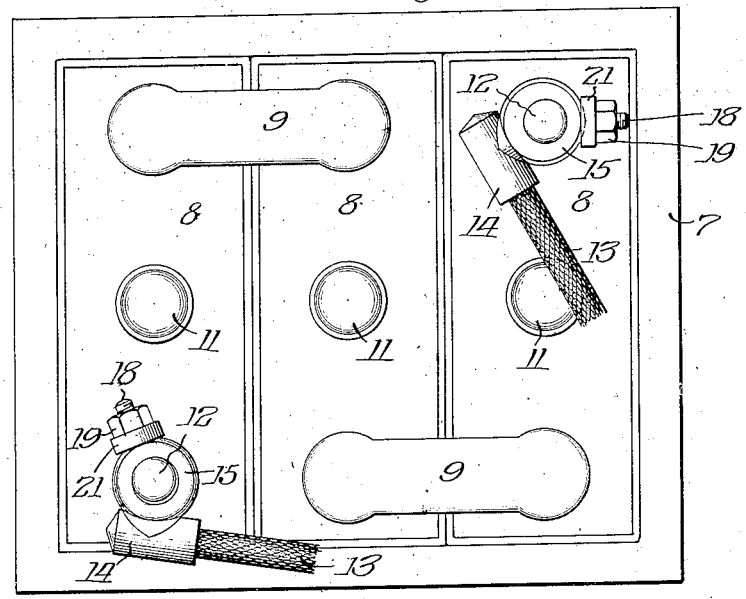
Fig. 1 is a plan view of a battery showing my invention applied thereto.
Figure 2:
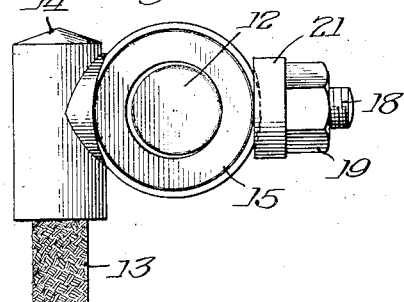
Fig. 2 is an enlarged plan view of my improved connection.

Referring to the drawings more in detail, reference character 7 indicates generally a battery case in which the cells 8 are arranged in the usual manner and electrically connected by the cell connectors 9, each cell being provided with the usual filling openings, normally closed by the plugs 11.

The end cells are equipped with the usual connecting studs 12, circular in cross section and customarily tapered from bottom to top, although the studs may be truly cylindrical from end to end, or any other preferred cross sectional shape.

Figure 3:
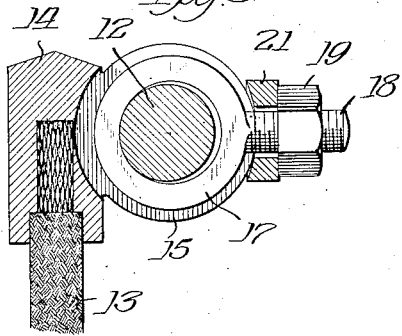
Fig. 3 is a horizontal sectional view therethrough.

13 indicates the cables leading from the battery, and while these cables may be attached to the cable terminals in any well known or preferred manner, such for instance as by brass lead-coated terminal plugs anchored to the end of the cable and adapted to fit a tapered opening in the cable terminal to which it is secured by a bolt threaded into a tapped core in the plug, I have shown herein for purposes of illustration a cable terminal, comprising a head 14 into which the stripped end of the cable 13 extends, the head being cast upon the end of the cable to ensure a satisfactory electrical connection and also protect the end of the cable insulation, as will be apparent from Fig. 3. The cable terminal comprises in addition to the head 14 a pair of laterally projecting portions 15 spaced apart as shown and provided with a vertically extending preferably tapered aperture 16 adapted to loosely receive the stud 12. The cable terminal therefore is of bifurcated construction and may be readily slipped onto the stud 12 or removed therefrom.

For the purpose of locking the cable terminal to the stud, I have provided a locking member which, as illustrated, is in the form of an eye bolt 17, the eye of which is adapted to be disposed between the projections 15 of the terminal and is adapted to loosely surround the stud 12. The shank 18 of the locking member is threaded to receive a nut 19 and a washer 21 is preferably interposed between the nut and the projections 15. While the eye of the bolt is shown as a complete ring, it may, if preferred, be hook-shaped instead.

Figure 4:
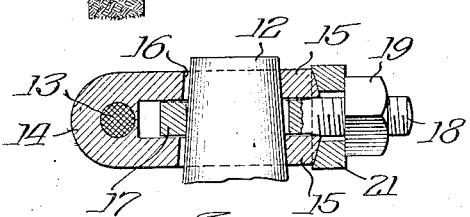
Fig. 4 is a vertical sectional view through the connection.
Figure 5:
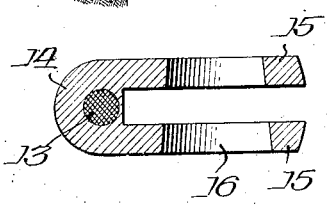
Fig. 5 is a similar view through the cable terminal.
Figure 6:
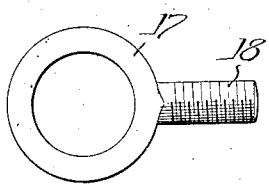
Fig. 6 is a detail plan view of the locking member.

In attaching my connection to a battery stud, the locking member is first disposed between the bifurcations 15 with the eye in alinement with the aperture 16, whereupon the whole connection is slipped onto the stud 12. The cable terminal may be adjusted angularly about the stud so that the cable will lead therefrom in the desired direction without being subjected to strains, and the locking member may then be swung about the stud to dispose the nut 19 in the most convenient and accessible position. The nut 19 is then tightened up or threaded onto the shank 18 forcing the washer 21 against the opposing edges of the projections 15 so as to cause a relative movement between the cable terminal and the locking member which firmly clamps the stud 12 between the terminal and the locking member, as illustrated in Fig. 4. The terminal is thereby securely locked to the stud with the cable leading therefrom in the desired direction and the locking nut disposed in accessible position. When disconnection of the terminal is required, the nut may be loosened, thus freeing the terminal so that it may be readily lifted off from the stud.

It should be apparent from the foregoing that I have provided a connection which permits of adjustment so that the cable may be led from the battery in any desired direction and the fastening means may be disposed in any convenient and accessible position. Furthermore, the cable terminal may be made entirely of lead and cast directly upon the end of the cable if desired, and the structure may be economically manufactured and easily and quickly attached to and detached from a battery when occasion requires.

While I have illustrated and described a preferred embodiment of the invention, obviously the details thereof may be varied within considerable limits without departure from the essence of the invention as defined in the following claims.

I claim:

1. A battery connection, comprising a cable terminal providing a socket for the reception of a cable and a pair of projections extending laterally in spaced relation from said socket and provided with aligned openings for the reception of a battery stud, an eye bolt, the eye of which is adapted to be disposed between said members in alignment with said openings and the shank of which projects radially outwardly between said members, said eye bolt being angularly adjustable about the battery stud and relatively to said terminal, and a nut threaded on said bolt to detachably clamp the connection to said stud.

2. A battery connection comprising a cable terminal provided with a socket for the reception of a cable, a projection on said terminal provided with a groove and a stud receiving aperture transverse to said groove, a locking member adapted to be engaged in said groove and having an opening adapted to be aligned with said aperture, said member having a threaded portion extending radially from said opening, the terminal and member adapted to be slipped over a battery stud, and a nut threaded on the radially extending portion of said member for clamping the terminal and the member to the stud, said terminal and said member being adjustable relatively to each other and to the stud angularly about the axis of the stud upon loosening the nut.

WILLIAM E. GILL.